(12) United States Patent
Westlin et al.

(10) Patent No.: US 11,799,748 B2
(45) Date of Patent: Oct. 24, 2023

(54) MITIGATING FAILURE IN REQUEST HANDLING

(71) Applicant: Uber Technologies, Inc., San Francisco, CA (US)

(72) Inventors: William Andrew Westlin, San Francisco, CA (US); Edward Joseph Farro, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 121 days.

(21) Appl. No.: 17/334,174

(22) Filed: May 28, 2021

(65) Prior Publication Data

US 2021/0288897 A1    Sep. 16, 2021

Related U.S. Application Data

(62) Division of application No. 16/539,990, filed on Aug. 13, 2019, now Pat. No. 11,310,140.

(60) Provisional application No. 62/799,742, filed on Jan. 31, 2019.

(51) Int. Cl.
*H04L 43/10* (2022.01)
*H04L 41/0631* (2022.01)
*H04L 41/069* (2022.01)

(52) U.S. Cl.
CPC .......... *H04L 43/10* (2013.01); *H04L 41/0631* (2013.01); *H04L 41/069* (2013.01)

(58) Field of Classification Search
CPC .... H04L 43/10; H04L 41/0631; H04L 41/069
See application file for complete search history.

(56) References Cited

U.S. PATENT DOCUMENTS

| | | |
|---|---|---|
| 7,023,979 B1 | 4/2006 | Wu |
| 7,372,952 B1 | 5/2008 | Wu |
| 8,300,798 B1 | 10/2012 | Wu |
| 10,171,623 B1 | 1/2019 | Gohil |
| 10,397,343 B1* | 8/2019 | Goldberg ............ H04L 67/1097 |
| 10,725,867 B2 | 7/2020 | Gianetti |
| 10,747,600 B2 | 8/2020 | Neijenhuis |
| 2003/0037113 A1 | 2/2003 | Petrovykh |
| 2008/0140701 A1 | 6/2008 | Kulbaba |
| 2009/0122972 A1 | 5/2009 | Kaufman |
| 2014/0161241 A1 | 6/2014 | Baranovsky |
| 2015/0170233 A1 | 6/2015 | Lisitsa |
| 2015/0281436 A1 | 10/2015 | Kumar |
| 2015/0281445 A1 | 10/2015 | Kumar |
| 2016/0021250 A1 | 1/2016 | Kumar |
| 2016/0036973 A1 | 2/2016 | Harasimiuk |
| 2016/0227035 A1 | 8/2016 | Kumar |
| 2017/0221071 A1 | 8/2017 | York |
| 2017/0242784 A1* | 8/2017 | Heorhiadi ........... G06F 11/3684 |
| 2017/0374145 A1 | 12/2017 | Chrysanthakopoulos |

(Continued)

*Primary Examiner* — Mohamed A. Wasel
*Assistant Examiner* — Kidest Mendaye
(74) *Attorney, Agent, or Firm* — MAHAMEDI IP LAW LLP

(57) ABSTRACT

A network computer system operates to mitigate failures for a network service. The network computer system can generate a data path model for the network service, where the data path model identifies a probabilistic set of expectations with respect to the programs and program sequences which handle service requests for the network service. The data path models can be used to detect, analyze or mitigate service request failures of the network service.

20 Claims, 9 Drawing Sheets

(56) References Cited

U.S. PATENT DOCUMENTS

| | | |
|---|---|---|
| 2018/0039565 A1* | 2/2018 | Rajagopalan ....... G06F 11/3476 |
| 2018/0089011 A1* | 3/2018 | Basiri ................... G06F 9/5077 |
| 2018/0165177 A1 | 6/2018 | Gupta |
| 2018/0307514 A1 | 10/2018 | Koutyrine |
| 2019/0036869 A1* | 1/2019 | Jana .................... H04L 61/5014 |
| 2020/0067800 A1 | 2/2020 | Wang |
| 2021/0173730 A1 | 6/2021 | Acosta |

* cited by examiner

US 11,799,748 B2

MITIGATING FAILURE IN REQUEST HANDLING

RELATED APPLICATIONS

This application claims the benefit under 35 U.S.C. § 120 as a Divisional of U.S. patent application Ser. No. 16/539,990, filed on Aug. 13, 2019, which claims the benefit of U.S. Provisional Patent Application No. 62/799,742, filed on Jan. 31, 2019, the entire contents of which are hereby incorporated by reference as if fully set forth herein.

TECHNICAL FIELD

This application pertains to mitigating failures in request handling by a network service.

BACKGROUND

The technology underlying many network services (e.g., ride-sharing, food-delivery, etc.) is complex and demanding. For example, on-demand network services generally utilize distributed network computing architectures to aggregate and process information from numerous sources, while at the same time, providing highly-responsive and relevant output to user requests and input. To fulfill service requests (e.g., requests generated from end users to receive service, service requests generated by predefined service events, etc.), a network service typically coordinates numerous workflows, some of which may depend on other workflows. Moreover, in some cases, the workflows may be implemented in-part using user devices and other third-party services.

In this regard, the complexities and demands of on-demand network services face a particular challenge with respect to detecting and mitigating failures by the various components. Given the dependencies of the components used for on-demand network services, an outage or failure by one component can have widespread impact on the service as a whole. For this reason, detecting and mitigating failures amongst individual components of an on-demand network computer system can be of paramount importance.

DETAILED DESCRIPTION

Figure 1:
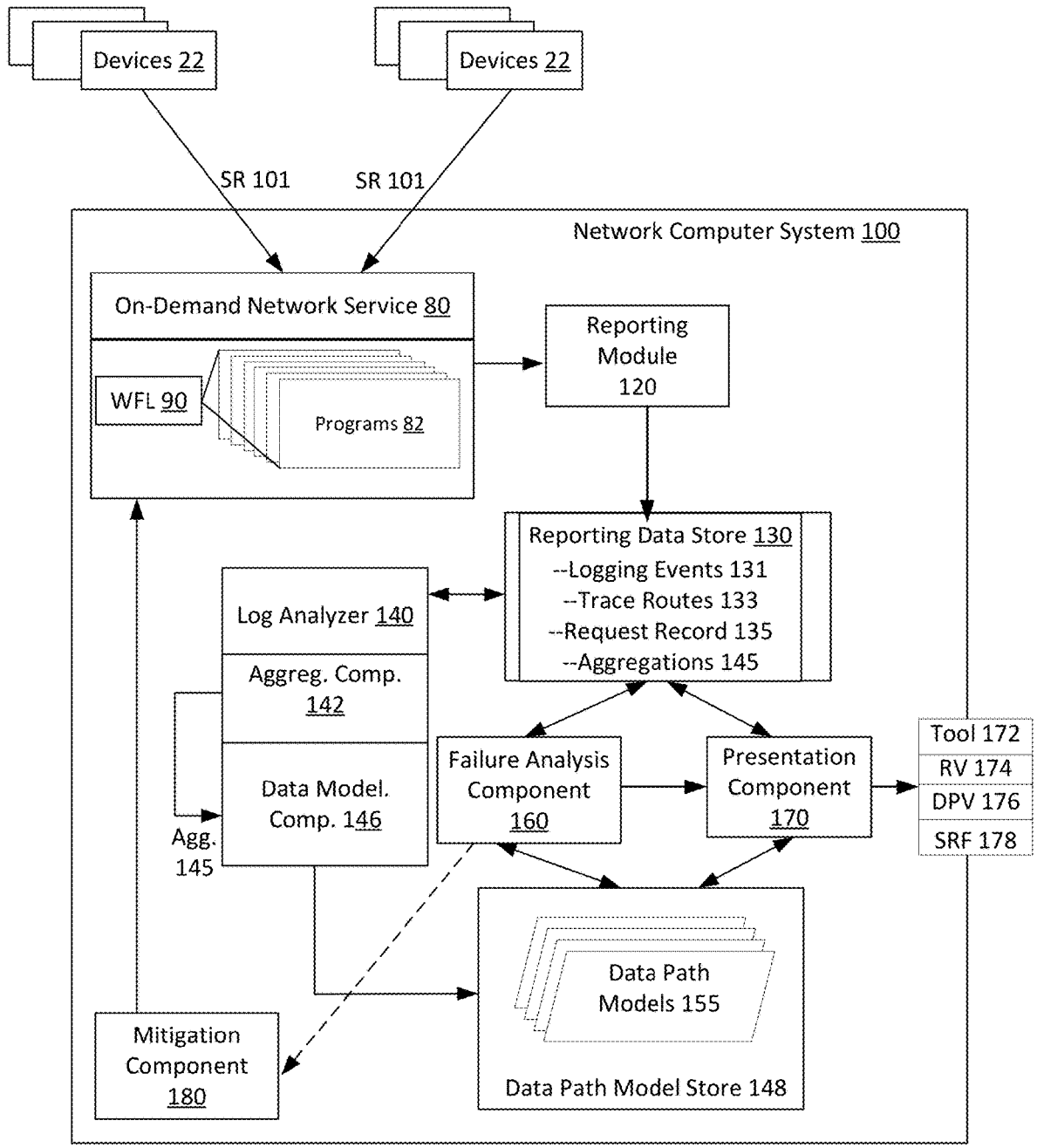
FIG. 1 illustrates an example system to generate and analyze data path models for requests handled by a grouping of programs that implement a network service.

According to examples, a network computer system utilizes logging in a distributed environment to develop and deploy data path models from which failures of components or services deployed in the distributed environment can be detected and mitigated. Among other benefits, an example network computer system as described can reduce the time to mitigation ("TTM") when an outage or an error occurs by a component that operates in the distributed environment.

In one aspect, the network computer system can provide an interactive tool to facilitate operators in quickly detecting failure by a component of the distributed environment, as well as to determine a cause of the detected failure. In variations, the network computer system can include logic to diagnose a detected failure, specifically to pinpoint a particular program (e.g., microservice, process, etc.) or candidate set of programs where a given failure likely occurred. Still further, in other variations, the network computer system can detect likely sources of failures, and further implement programmatic operations to mitigate or remediate such detected failures (e.g., trigger a restart of the program or process that is detected as having failed). By reducing the TTM for the distributed environment, examples as described can decrease the impact of an outage in the distributed environment. In regard to an on-demand network service that is provided through the distributed environment, for example, the reduced outage provides greater reliability in the availability of the on-demand network service for a given population of users.

In examples, a network service may implement one or multiple processes (e.g., performed by programs or services) to handle different types of service requests, where each process implements workflow logic and workflow(s) to handle particular types of service requests. A network service may utilize different processes to handle service-related events for different types of users (e.g., service provider and service requester). According to examples, a network service may utilize multiple processes in connection with service-related activities of an individual user, where each process is initiated by a request.

According to examples, a data path model includes a plurality of program nodes, with each program node representing one of multiple programs that receive and act on data associated with service requests of corresponding user devices. In a data path model, each program node is associated with corresponding sequence data that identifies an expectation that the program represented by the program node is called by or calls any of one or more entities (e.g., other programs, user device), to perform tasks in connection with handling of an incoming service request.

Additionally, a data path model can specify an arrangement for a corresponding plurality of program nodes, where the arrangement is in accordance with the sequence data associated with each of the plurality of program nodes. In this way, the arrangement of the data path model reflects at least one data path by which the corresponding programs execute to receive and act on data associated with a service request, so that the service request is successfully handled.

Still further, in examples, a network computer system operates to determine a data path model for a process of a network service, where the determined data path model identifies an expectation of how a workflow for the process will be implemented to successfully handle a service request. A determined data path model may further include one or more probabilistic determinations, relating to whether or not individual program events (e.g., a particular program being called or initiated) occur in a workflow of a process, and/or a sequence in which certain program events of the workflow occur. In examples, the network computer system can further utilize the determined data path models to detect, analyze and/or mitigate against service request failures. In examples, a service request that fails (or a failed service request) refers to a service request that was not successfully handled by the network service as a result of a failure by a program or process of the network service.

According to examples, a network computer system operates to determine, from analyzing one or more types of logging information, at least a first program of the multiple programs that acted on data associated with the failed service request. The network computer system further identifies, from the data path model, a second program of the multiple programs that was expected to receive and act on data associated with the service request that failed, where the second program is identified based at least in part on the sequence data associated with the second program. In examples, the network computer system can use logging information associated with the second program to detect a failed service request. The network computer system may also utilize the logging information associated with the second program to analyze the programs of a process which handled the failed service request. By way of example, the network system can analyze the handling of the failed service request to (i) pinpoint a specific program or set of programs where the failure is manifested; (ii) identify a variance or deviation as to how the network service handled the failed service request as compared to how the network service should have (or was expected to handle the service request); (iii) identify a candidate set of programs from which a cause of the failed service request may be inferred or detected; and/or (iv) determine a likely cause or source for the failure.

In some examples, the network service can respond to a failed service request by (i) generating a notification or alert for a network operator, and/or (ii) providing a user-interface for the network operator that organizes information that the network computer system determines is associated with the particular service request failure. The information provided with the network computer system can, for example, identify (i) program(s) of a workflow for handling the failed service request which performed as expected, (ii) program(s) of the workflow which reported an unexpected error in connection with the handling of the failed service request, and/or (iii) programs of the workflow which were not called as may have otherwise been expected for the service request to have been successfully handled.

Still further, in some examples, the network computer system can respond to a failed service request by determining a program that is a likely source of the failure. As an addition or variation, the network computer system can determine one or multiple candidate programs that are a source for a failed service request. For example, multiple programs may be identified, where each program is associated with a probability of being a source of the failed service request. A program that is the source of a failed service request can include a program that failed to properly execute when triggered in the workflow for handling the service request, where the failure of the program is not attributable to the failure of another program in the same workflow.

In examples, the network computer system can determine a program that is a source for a failed service request, and/or one or more programs which are candidate sources for the failed service request. The network computer system may identify the determined source program(s) on a user-interface that is generated for a network operator. As an addition or variation, the network computer system may programmatically implement one or more remedial actions to affect the operation of the one or more source program(s) to mitigate against future occurrence of service request failures.

Still further, in other examples, a network computer system can operate to mitigate failures on an on-demand network service. In examples, the network computer system may aggregate logging information for a collection of service requests to the on-demand network service, where the logging information including trace routes that identify (i) multiple programs which execute to fulfill each service request of the collection, and (ii) timing information that identifies a relative timing as between individual programs of the multiple programs executing in fulfilling service requests. The network computer system can determine, from the aggregated logging information, a data path model that identifies multiple possible data paths, where each data path represents a sequence by which at least some of the multiple programs execute to fulfill service requests. The network computer system may further analyze a trace route for a failed service request to the on-demand network service, and determine, from analyzing the trace route, at least a first program that executed to fulfill the failed service request. Additionally, the network computer system can determine, from the data path model, at least a second program of the multiple programs that was expected to act on the service request that failed, where the second program being identified based at least in part on the sequence data associated with at least one of the first program or the second program.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, tablets, wearable electronic devices, laptop computers, printers, digital picture frames, network equipment (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

Network Computer System

FIG. 1 illustrates an example network computer system to generate and analyze data path models for service requests handled by a grouping of programs that implement an on-demand network service. With respect to examples as described, a network computer system 100 can be implemented on a server, on a combination of servers, and/or on a distributed set of computing devices which communicate over a network such as the Internet. Still further, some examples provide for the network computer system 100 to be distributed using one or more servers and/or mobile devices. As described in greater detail, network computer system 100 can develop and utilize data path models to reduce the TTM for failures that occur when the on-demand network service is deployed.

With reference to FIG. 1, network computer system 100 monitors and evaluates the handling of service requests by programs 82 of an on-demand network service 80. In examples such as described with FIG. 1, the network computer system 100 implements the on-demand network service 80 in conjunction with performing evaluation, diagnosis, failure analysis and/or mitigation. In variations, the network computer system 100 and on-demand network service 80 can be logically separated, so as to be implemented on different computing environments. Still further, in other examples, the network computer system 100 can operate independently of the on-demand network service 80.

In examples, the programs 82 can cooperate to implement the network service for a given group or population of users and/or devices. The on-demand network service 80 can be implemented by programs that operate on the network computer system 100, in conjunction with device processes that operate on individual devices (e.g., user devices) that are external to the network system.

In some examples, the network computer system 100 provides the on-demand network service 80 using a micro-service network architecture. In the micro-service architecture, each of the programs 82 implement a microservice for the network computer system 100. In implementing a microservice, each program supports a specific set of tasks and a particular objective, with well-defined programmatic interfaces for providing functionality such as logging and communicating with other programs or entities. In this way, the on-demand network service 80 can be implemented in part by the programs 82 to provide a variety of outcomes for devices (e.g., end user devices) that generate service requests for the network service 80. Accordingly, the on-demand network service 80 can use the programs 82 to implement a distributed architecture, where multiple workflows are possible to handle incoming requests, and where individual workflows differ from one another by the sequence in which the programs 82 are implemented. By way of example, the on-demand network service 80 can include transport arrangement services, delivery services, meetups, etc. While some examples of FIG. 1 are described in context of the programs 82 executing to handle incoming service requests 101 from user devices 22, examples can be implemented in alternative context, such as handling requests to the on-demand network service 80 from other types of external entities (e.g., other network services).

With further reference to FIG. 1, the network computer system 100 can receive incoming service requests 101 from user devices 22. The user devices 22 can, for example, execute respective service applications that communicate with a service interface 102, in order to communicate and use the on-demand network service 80. In this way, the user devices 22 can be used to generate service requests 101 of the on-demand network service 80. The on-demand network service 80 can be implemented in part of a group of programs 82, which execute cooperatively to perform a series of tasks with respect to the handling of individual service requests 101.

According to examples, each of the program 82 executes using data associated with an incoming service requests, to perform tasks that support the progress of the service request 101 towards completion. The handling of a service request 101 to successful completion can involve the performance of numerous tasks by different programs, and when the tasks are complete, the service request is successfully handled. The on-demand network service 80 can implement workflow logic 90, with the individual programs 82 and/or separately, to manage the initiation of individual programs 82 for receiving and acting on data associated with the incoming service requests 101. The workflow logic 90 can execute as part of the individual programs 82, in order to enable the programs to call and initiate other programs for successful completion of the handling of the individual service requests 101. The workflow logic 90 can also execute to call individual programs 82, such as from initial receipt and handling of the service request 101 by the on-demand network service 80.

In examples, the determination of the sequence by which the individual programs 82 are called to perform tasks for the incoming service request 101 may be based on a variety of factors, such as (i) an existing load on the on-demand network service 80; (ii) the availability of a resource which a particular program 82 requires when performing one or more of its tasks; (iii) network latency; (iv) information specified by a particular service request; (v) the objective or goal for a particular service request; (vi) the successful completion of task performed by other programs; and/or (vii) the particular network process for that handles the service request. As such, the particular sequence in which the programs 82 execute to handle service requests 101 can vary amongst different workflows. In some examples, upon receipt of an incoming service request 101, workflow logic 90 can call an initial program 82 to perform a set of tasks that support the service request, and the initial program 82 may then call another one of the program 82 to initiate the next program in performing its set of tasks to support the incoming service request 101.

Some program 82 can thus execute to call other programs 82 in accordance with a sequence that can be determined in part, by individual programs implementing aspects of the workflow logic 90. Each program that is called for an incoming service request 101 can then execute, using data associated with the service request 101, to perform its own respective set of tasks. Once a succession of programs 82 are called to complete their respective tasks, the handling of the service request 101 may be successfully completed.

The network computer system 100 can include a reporting module 120 which interfaces with the individual programs to retrieve log information. The reporting module 120 can interface with individual programs 82 (or their respective logging data) to collect, or otherwise generate various types of logging information for each successful service request that is received and handled by the on-demand network service. In examples, the logging information can include (i) logging events 131, which can be generated independently by each program 82, to identify the occurrence of predetermined events (including events that coincide with the program having a failure) when the particular program performs its respective tasks, and (ii) trace routes 133, which can identify each program that previously performed a task or otherwise handled a service request. In some examples, the reporting module 120 can generate trace routes 133 through analysis of the logging events 131, using information that identifies the reporting program of a logging event and the accompanying time stamp(s) of when the event occurred. In examples, the logging information can record multiple time stamps, including a time stamp for when a reporting program starts and/or a time stamp for when a reporting program completes.

Additionally, in examples, the reporting module 120 can generate partial trace routes for failed service requests. As described in greater detail, such partial trace routes can identify, for example, the program that last performed a task in connection with the failed service request, and/or the program that last recorded a logging event in connection with being called to perform a task for a given service request.

In examples, the reporting module 120 can store logging events 131 and trace routes 133 in the reporting data store 130 for both successful and failed service requests. As described in greater detail, the logging information can be aggregated and analyzed to determine data path models for individual processes of the network service. Additionally, the reporting module 120 can structure service request records 135 to associate service requests 101 with logging events 131 and trace routes 133 which are generated for the particular service request.

The network computer system 100 can include a log analyzer 140 to analyze the trace logs. In examples, the log analyzer 140 includes an aggregation component 142 to aggregate the logging information generated by the programs 82 of the on-demand network service 80. The aggregation component 142 can aggregate trace logs for successful service requests (e.g., service requests which the on-demand network service receives and successfully completes), to determine aggregations 145 reflecting (i) a count of each instance that each program used by the on-demand network service received and acted on an incoming service request, and (ii) a sequence position of each program at each instance the program was called or started for a service request (e.g., as reflected by time stamp when program started), relative to at least one other program 82. As an addition or variation, the sequence position of each program may reflect the time when the program completes its task(s) (e.g., as reflected by time stamp when program completes) in connection to other programs that execute to handle a particular service request. The respective aggregations 145 can be conducted over a sufficient period of time to reflect an accurate statistical sample. Additionally, in some variations, the respective aggregations 145 can be continually updated.

In examples, the log analyzer 140 can analyze the respective aggregations 145 to identify a probability or likelihood of a given program is used in a particular sequence position for a given process or the network service. Through additional analysis, sequences as between at least two programs 82 of the group, as well as a frequency by which the particular sequence occurred, can be determined. Still further, in some examples, multiple data paths can be determined in the workflow of a given process, where each data path represents a sequenced grouping of the programs 82 which can combine to fulfill a given service request. The sequenced groupings may be determined based on prior handling of service requests, where the sequenced groupings each include data that defines the relative timing as to how individual programs of the particular grouping perform a task in the fulfillment of a service request.

For a given process of the network service, the log analyzer 140 can analyze the aggregations 145 to identify a relative order when a program 82 reported a logging event. The order in time of logging events can be used to determine a sequence among programs that cooperated to successfully handle a service request 101 that was handled by the process. Each sequence of successive programs 82 that execute to successfully handle a service request can be identified as a data path for the service requests. Through aggregation, multiple data paths can be identified, and multiple possible data paths may exist for handling incoming service requests 101. Still further, in aggregating the trace logs, the aggregation component 142 can identify, for each of the programs 82, sequencing information that includes (i) a sequence of the program executing (or being called by another program) relative to one or more other programs (e.g., each program 82 that calls it), and/or (ii) a probability that the program is called by, or otherwise initiated after, one or more other programs perform (or initiate performance) of a task.

Based on the statistical determinations of the counts for each program, the relative position of each program when used, and the determined sequencing information, the log analyzer 140 can generate a data path model 155 for a corresponding process of the network service. The generated data path model may be in the form of a graph data structure, reflecting the possible data paths of the on-demand network service, with each data path reflecting a statistical probability of occurrence. In examples, the log analyzer 140 includes a data path modeling component 146 that uses the aggregations 145 that are determined from the logging events 131 and/or trace routes 133 (as recorded with the reporting data store 130) to develop and/or update one or more data path models 155, which can be stored in a data path models store 148. In examples, each data path model 155 can represent each program of the on-demand network service 80 as a program node, and the data path model can identify sequenced groupings of programs in accordance with a logical arrangement that reflects possible or alternative sequences amongst programs. In this way, each data path model 155 can identify one or more data paths, each of which identify the relative order that a particular program is called or otherwise executed as compared to another program (e.g., the calling program).

The aggregation component 142 of the log analyzer 140 can continuously generate aggregations 145 of logging information for individual processes of the network service. The aggregations 145 of successful service requests can be used by the data path modeling component 146 to update the respective data path models 155 of corresponding processes of the network service 80.

In examples, the arrangement of each data path model 155 can be in the form of a graph data structure, with alternative sequences being identified by links stemming from individual nodes to linked nodes. The possible sequences by which programs execute, beginning with an initial program that receives a service request, can be represented in the data path model 155 through use of sequence information. The sequence information can be associated with each program node to link the program node to one or more other nodes (e.g., linked nodes). For a given program node, the sequence information can represent other program(s) 82 that call the program represented by the linked node. In this way, the sequence information can be associated with a probability of occurrence (e.g., a probability that a linked node will be the next event following a given node performing a task in connection with a service request).

As an addition or variation, each program node can also be associated with probability information. The probability information can reflect a probability that a given program will be called by or calls any of the programs which the sequence information identifies as potentially calling the given program. As an addition or variation, the probability information can reflect a probability that the program 82 will be called at some point during the handling of an incoming service request.

As an addition or variation, each data path model 155 can also identify a collection of possible data paths, with each data path identifying a succession of programs that can be called to successfully handle an incoming service request in accordance with a given sequence. In examples, each data path model 155 can represent programs as program nodes, with program nodes being arranged through links to reflect sequence information and probability information (e.g., probability that a given sequence will occur, or that a particular program will be called after another program performs a task). By arranging program nodes in accordance with sequence information and probability information, the data path models 155 provide expectations as to what events may occur immediately after a given program being initiated or performing a task associated with a service request. Specifically, the data path models 155 can identify a next event or program that is initiated by or in response to a given program receiving a call. Thus, for example, when a given program 82 executes to receive and act on data associated with the service request, the data path model 155 provides an expectation of what other program(s) may be called next.

According to some examples, network computer system 100 includes a failure analysis component 160. The failure analysis component 160 can access or otherwise receive logging events 131 from the reporting data store 130, when the logging events 131 reflect a failure by the service request. The logging events for failed service requests can include partial trace routes, identifying programs that received and acted on data of the service, prior to the service request failing. In examples, the failure analysis component 160 uses the partial trace route of the failed service request to identify an appropriate data path model 155. As described, many factors can determine the sequence by which programs 82 execute to handle individual service requests. Accordingly, individual data path model 155 can vary from other data path models 155, by which program node(s) represent the beginning event, meaning which program 82 first receives the service request 101, or which set of programs 82 receive an incoming service request. The failure analysis component 160 can thus parse or inspect the partial trace route to identify an initial set of programs that received and handled the service request. The failure analysis component 160 can then match the first identified program of the trace route, or the first set of programs of the trace route, to initial program nodes of each of the data path models 155 to identify the data path model that is a match to the partial trace route.

The failure analysis component 160 can use the partial trace of the failed service request (as determined from the reporting data store 130) to identify one or more events that preceded the failure of the service request 101. In examples, the failure analysis component 160 may parse or otherwise inspect the partial trace log of the failed service request 101 to identify an event corresponding to the last program that was called to act on a failed service request. In some examples, the failure analysis component 160 can then map the data path of failed service request to program nodes of the selected data path model 155. Based on the last program 82 that is identified in the trace log, the failure analysis component 160 can determine an expectation of what event should have occurred next. For example, the data path model 155 can be used to identify which of the programs 82 were likely to have followed the last identified program which received and acted on the failed service request. In this way, the failure analysis component 160 can utilize one or more data path models to (i) identify, from the trace route of the failed service request, the last program to successfully perform a task for the failed service request; and (ii) identify, from a corresponding data path model 155, a candidate set of programs that are the cause of the service request failure. For example, the candidate set of programs can include each program that is a possible next event after a particular logging event(s) (as identified by the data path model 155), and/or the program that is the most likely program to be called after the particular logging event(s) (the "likely next" program, as determined from the probability information). As an alternative or variation, if the data path model 155 shows that the "likely next" program is a branch to a possible series of other applications being executed, the failure analysis component 160 may mark the "likely next" program as the starting point for another analysis to pinpoint the cause of the failed service request.

In some examples, the failure analysis component 160 can identify one or multiple programs of a process where the failure of the process is manifested. Additionally, the failure analysis component 160 can pinpoint one or more likely program sources of the failure by the process. The determination of the failure analysis component 160 may be based on a variance or deviation as to how the network service 80 handled the failed service request as compared to how the network service 80 should have (or was expected to handle the service request). In some examples, the determination may be made by the failure analysis component 160 comparing the implemented workflow for the failed service request with the data path model for the process. Still further, in examples, the failure analysis component 160 can utilize the comparisons to pinpoint one or more programs of the failed process which are likely program sources of the failure.

Additionally, in some examples, the failure analysis component 160 may correlate the programs which are identified as the source of the failed service request with one or more underlying causes. The failure analysis component 160 may use for example, historical information and models to correlate programs that are pinpointed as the source of the failure with one or more potential root causes for the failed service request.

In examples, the failure analysis component 160 can use additional logic and processes to pinpoint the source of a service request failure, once an initial candidate set of programs is identified as being the source of failure. For example, in the case where the the trace route for a failed service request identifies the last program to be a branch to multiple other downstream programs, the failure analysis component 160 can query the reporting data store 130 for event logs generated by one or more of the downstream programs to identify logging events which are indicative of a program failure (e.g., downstream programs reporting errors), either with the particular program that the generated the queried logging information, or with another program that called or was called by the program which generated the logging information.

In some examples, the failure analysis component 160 can also employ inference logic to infer a candidate program as being the RFa service request failure. The failure analysis component 160 can identify the source of the failed service request by, for example, querying reporting data store 130 to determine real-time logging information for programs that are downstream, as identified by the respective data path model 155, from the program that is identified from the partial trace route of the failed service request as being the last program to handle the failed service request. The failure analysis component 160 can process the logging information of the downstream programs to identify indicators, such as a reduction in the number of event logs (e.g., as compared to an immediately prior time period) that any one of the downstream programs may generate. Indicators such as a determination that a given program has reduced its logging events can be mapped, using the respective data path model, to, for example, an upstream program (e.g., a program that may have called the downstream program in accordance with the respective data path). In the case where the particular downstream programs logging information indicates normal operations but less frequent use of the program, the failure analysis component 160 can infer that the calling program is the source of the failed service request.

The network computer system 100 can include a presentation component 170 to generate content to facilitate comprehension and/or manual mitigation of network errors in the execution of the programs 82. In examples, the presentation component 170 provides an interactive mitigation tool 172 for use by administrators and operators of the on-demand network service 80. An example of a mitigation tool is shown and described with examples of FIG. 3A through FIG. 3C, as well as with examples of FIG. 4A through FIG. 4F. As described with such examples, the mitigation tool 172 can implement one or multiple interfaces from which an operator can view information for mitigating the cause of failures on the on-demand network service 80.

The presentation component 170 may interface with the reporting data store 130 to retrieve logging information, from which the presentation component 170 may can generate one or more types of presentations for the mitigation tool 172. In examples, the presentation component 170 can generate a record view interface 174 (e.g., see FIG. 3A, FIG. 4C and FIG. 4D) for failed service requests. When logging information from the reporting data store 130 indicates a service request has failed, the presentation component 170 can retrieve and present information from the request record 135 from the reporting data store 130. In examples, the record view interface 174 can include (or make available for rendering) the logging events 131 of the failed request, the trace route 133 for the failed service request, and/or other information maintained with the service request record 135.

As an addition or variation, the presentation component 170 can also generate one or more data path view interfaces 176 (e.g., see FIG. 3B) for a failed service request. The data path view interface(s) 176 can include a graphic representation of the data path of the failed service request when it was handled, up to the point where the service request was deemed to have failed. The graphic representation can be generated from the partial trace route for the failed service request. The data path view interface 176 also utilize, for example, an output of the failure analysis component 160 to identify one or more programs that are deemed to be the source (or candidates thereof) of the service request failure. In such examples, the presentation component 170 can generate the data path view interface 176 to visually indicate candidate programs which are the source of a detected service request failure. For example, a portion of a rendered data path can be delineated and/or visually marked to indicate a candidate program or source for the failed service request. In some variations, the presentation component 170 can also combine the candidate programs with a query to the reporting data store 130, in order to, for example, enable the operator to query for logging information about programs that are identified as being a source, or a potential source of a service request failure.

In variations, the data path view interface 176 can identify which program last received and acted on the failed service request, based on the output of the failure analysis component 160. The data path view interface 176 can also be mapped to the relevant portions of the selected data path model to enable the operator to see information such as (i) a rendering of a portion of possible or expected data path for the failed service request, following the point where the failure occurred; and/or (ii) a visual rendering of sequencing and/or probability for the next event that was to have followed the last program identified from the trace route performing a task for the failed service request. In this way, the data path view interface(s) 176 can present the portion of the relevant data path model 155, while identifying the program (or programs) that were the most likely cause of the failed service request.

As an addition or variation, the presentation component 170 can also generate a service request feed 178 (e.g., see FIG. 3C) that presents groupings of service requests in a given time interval, including a current time interval (e.g., service requests received by the on-demand network service 80 in a current one-minute interval). The service request feed 178 can be filtered to location, service type, time interval and/or other factors. To generate the service request feed 178, the presentation component 170 can query or otherwise interface with the reporting data store 130 to identify service request records for a given time interval (e.g., current time interval). The presentation component 170 can utilize an analysis of the trace route 133 and/or other logging events 131 to determine a status of each service request displayed as part of the service request feed 178. By way of example, the status of individual service requests can be designated to be one of in progress, completed successfully, in progress and potentially having failed, or failed. Each service request can be separately identified in the feed, and each service request may also include a visual marker to indicate the current determined status of the service request. In this way, the service request feed 178 can be used to enable an operator to visually view and understand the current state of the on-demand network service 80, without requiring the operator to have to perform tasks to locate whether potential failures exist with the on-demand network service 80.

In some variations, the network computer system 100 may also include one or more programmatic processes (mitigation component 180) to implement a mitigation or remediation step. The mitigation component 180 can, for example, interface with individual programs 82 of the on-demand network service 80. The mitigation component 180 can respond to an output of the failure analysis component 160 by selecting and performing a remedial step, such as signaling a program that is identified as having failed to restart, or isolating a set of programs which are deemed to be candidates for a service request failure.

FIG. 2A through FIG. 2D illustrates example portions of data path models for programs that handle a service request to a network service. The portions of the data path models represented by FIG. 2A and FIG. 2D can be generated by, for example, network computer system 100, such as described with examples of FIG. 1. Accordingly, reference may be made to elements of FIG. 1 for purpose of illustration.

Figure 2A:
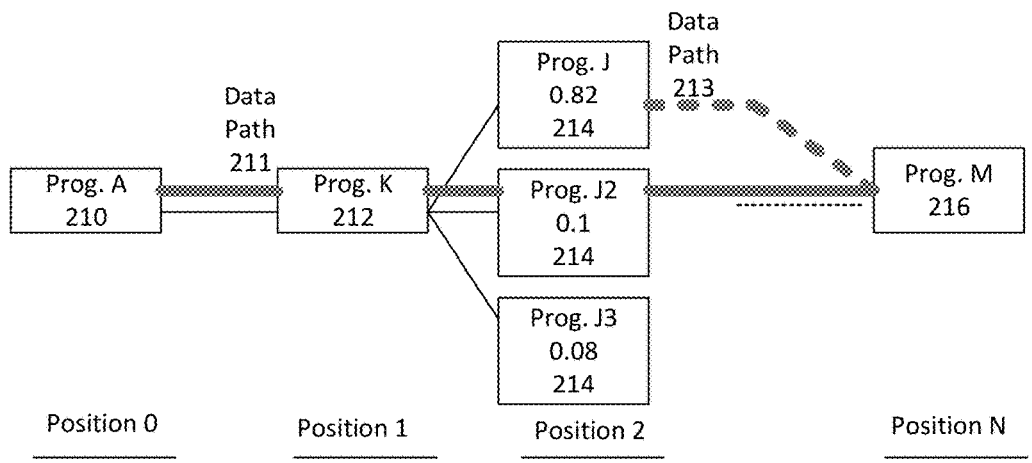
FIG. 2A through FIG. 2D illustrates example portions of data path models for programs that handle a service request to a network service.

In FIG. 2A, a grouping of programs is shown, reflecting an expectation of events with respect to the handling of an incoming service request by the network service 80 (e.g., by a particular process of the network service 80). In an example shown, individual program nodes 210-216 represent programs 82 of the on-demand network service 80 which execute in accordance with a particular sequence or timing, relative to other programs, in order to properly handle the service request. The sequencing of the individual programs 82 may be based on, for example, the relative start and/or completion times of the respective programs. The determination of expected events can be based on prior observation, such as aggregation of trace routes for successful service requests. As shown by FIG. 2A, each program node 210-216 is associated with sequencing information and probability information. The sequencing information (represented as a connector) can identify a relative position in time of each program being called, or otherwise executing to act on a service request, relative to one or more other programs.

The probability information can identify a likelihood that a particular sequence will take place. For example, in FIG. 2A, a sequence of program 212 ("Prog. K") following program 210 ("Prog. A") is certainty, while a sequence in which either "Prog. J2" or "Prog. J3" follows "Prog. K" is relatively small (e.g., 12% and 8%) as compared to the sequence where "Prog. J" following "Prog. K". In variations, other probability information can also be maintained and used with given data path models, such as the probability that "Prog. J3" will act on the service request when the service request is first received and acted on by program 210 (Prog. A").

For a given data path model, some programs can also be identified as being dependent on other programs. In FIG. 2A, for example, one of the programs 214 ("Prog.J", "Prog.J2" and "Prog. J3") may be called by program 212 ("Prog. K"), which may in turn be called by program 210 ("Prog. A"). In a given data path model 155, the programs that may be called by other programs can be said to be dependent programs, meaning dependent on the calling program. Additionally, for a given data path model 155, a succession of programs (e.g., including dependent programs) can act on an individual service request in accordance with a sequence, resulting in a final program that completes the tasks of the service request. The succession of programs that act on individual service requests in accordance with an expected sequence can define one of multiple possible data paths (e.g., data paths 211, 213) for a service request that is to be successfully handled under a given data path model 155.

In examples, the sequencing information can be represented by the program's position with respect to an overall sequence of dependent programs that act on the service request until its completion. In an example of FIG. 2A, a program sequence position can range from position 0 to position N, where position 0 can represent the program 82 that first receives the incoming service request, and position N representing the program that is the last to be called or otherwise executed before the service request is deemed complete.

Figure 2B:
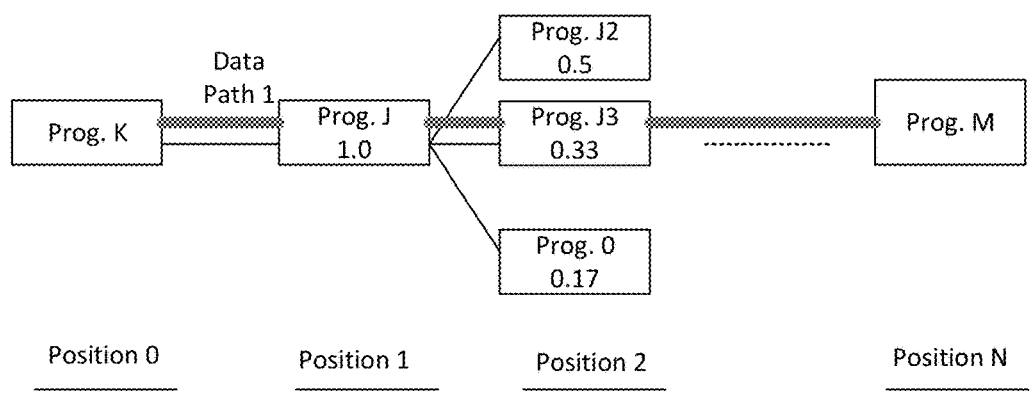

FIG. 2B illustrates use of different data path models 155 to determine expectations for a common type of service request. In FIG. 2B, the initial program 82 having the position 0 (e.g., the first program 82 of the group to act on an incoming service request) is the program that occupies position 1 in the data path model 155 of FIG. 2A. Thus, each data path model 155 can be characterized by one or more initial programs that receive and act on incoming service requests. The particular program 82 that is triggered to initiate handling of incoming service request can vary based on factors, as discussed, such as information specified by the load on the network service at the particular time, as well as the availability of individual programs 82.

Figure 2C:
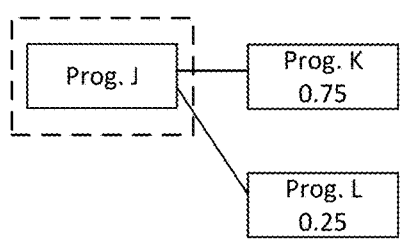
Figure 2D:
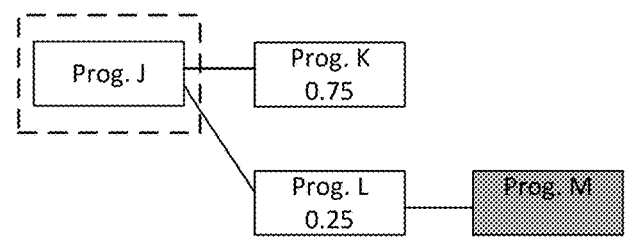

FIG. 2C and FIG. 2D illustrate alternative scenarios by which a relevant portion of an applicable data path model 155 can be used to determine a cause of a network failure (e.g., service request fails). In FIG. 2C, for example, the failure analysis component 160 can use the partial trace route of a failed service request to identify the last program that acted on the service request as being "Prog. J". The relevant portion of the applicable data path model 155 can indicate alternative possible sequences—to "Prog. K" (75%) and to "Prog. L" (25%). The indication can narrow the possibility of which program 82 in the grouping caused the failure by the service request to "Prog. K" and "Prog. L". Any additional analysis needed to determine which program cause the service request failure can now be initiated on "Prog. K" as the most probable choice, followed by "Prog. L".

In FIG. 2D, the failure analysis component 160 can perform additional analysis as described by retrieving logging information relating to a downstream program ("Prog. M") of "Prog. L". The failure analysis component 160 can retrieve, for example, logging information from the reporting data store 130 for "Prog. M" (e.g., query for logging events relating to "Prog M"), in order to determine whether there has been a recent drop in logging events from that program. As an addition or alternative, the failure analysis component 160 can query to determine whether Prog. M has is logging any information, or whether another program that is dependent on Prog. M is reporting a log error that indicative of that program not receiving calls.

As illustrated by examples of FIG. 2A through FIG. 2D, the data path models 155 can be used to facilitate evaluation of the network service, in situations such as when service request are detected to fail. By generating multiple data path models 155 to represent alternative sequences for service request handling, a relevant data path model 155 can be identified for a failed service request. The relevant data path model 155 for a failed service request can be used to identify a set of expectations as to what programs were to execute for the successful handling of the service request, and such expectations may specifically identify the sequence by which at least some of the programs 82 were to execute. When the relevant data path model 155 is combined with, for example, information determined from trace routes, the logical juncture where the failure occurred can be identified and correlated to a specific program or set of programs 82.

Example Operator Interfaces

Figure 3A:
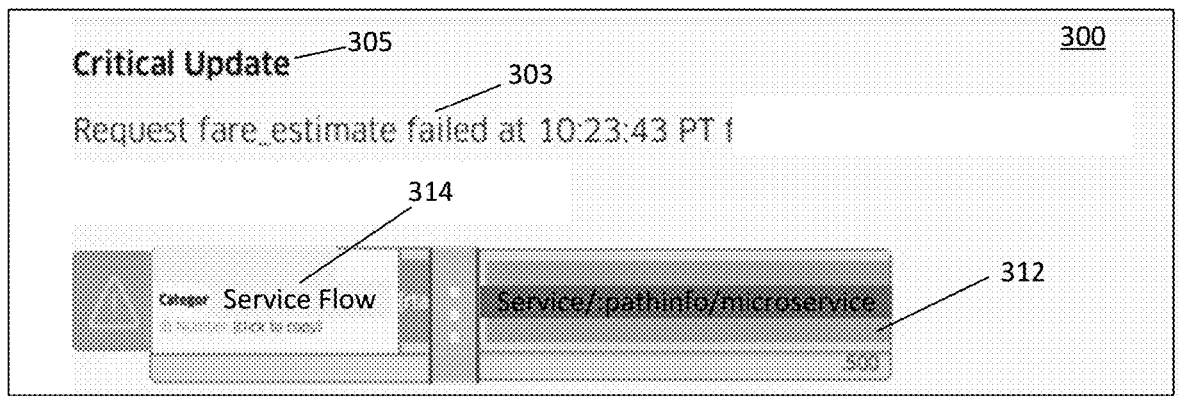
FIG. 3A through FIG. 3C illustrate an example of an operator user interface to facilitate mitigation of a network service failure.
Figure 3B:
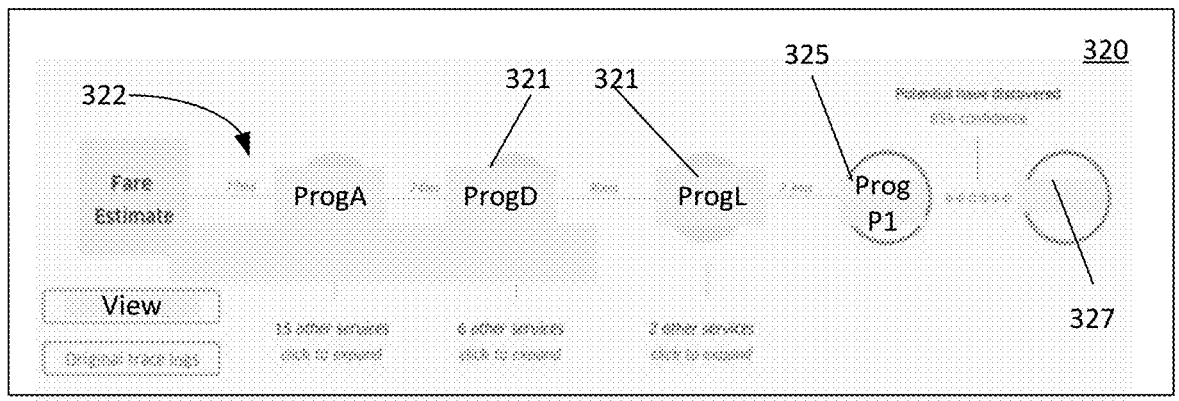
Figure 3C:
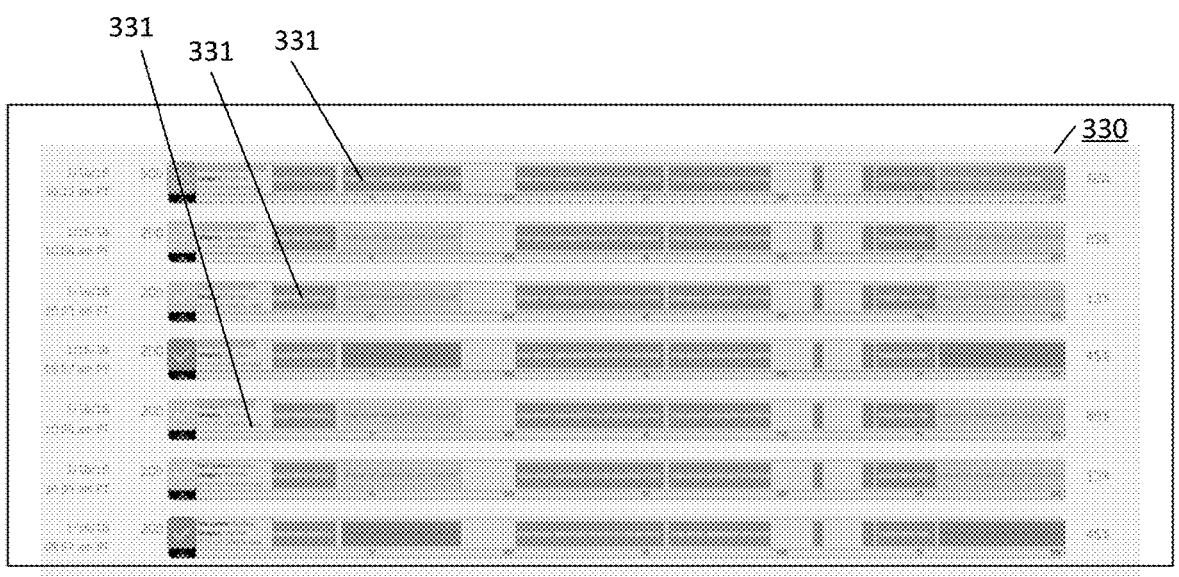

FIG. 3A through FIG. 3C illustrate an example of an operator user interface to facilitate mitigation of a network service failure. FIG. 4A through FIG. 4D illustrate another example of an operator user interface to facilitate mitigation of a network service failure. Example interfaces as shown by FIG. 3A through FIG. 3C, and FIG. 4A through FIG. 4D, can be displayed on, for example, a terminal or workstation of an administrator or other operator who is delegated the task of monitoring performance and/or mitigating failures when the network computer system 100 is deployed to implement a network service. Accordingly, example interfaces as shown by FIG. 3A through FIG. 3C and FIG. 4A through FIG. 4D can be implemented through network computer system 100 and provided as part of, for example, an interactive mitigation tool 172 (see FIG. 1) for enabling the operator to mitigate failures of an on-demand network service. Accordingly, in describing example operator interfaces with FIG. 3A through FIG. 3D and FIG. 4A through FIG. 4D, reference to elements of FIG. 1 may be provided to illustrate relevant functionality and components for implementing interactive interfaces.

In FIG. 3A, an example interface 310 can be generated by the presentation component 170 to show a record view of a service request that was identified as failing. The interface 310 can identify a failed record by type information 303. Additionally, the interface 310 can identify the priority level 305 of the detected failure. Depending on implementation, the service request can be a test case or the result of a live production. Information about the detected failure can be provided through, for example, analysis of the logging information associated with the corresponding service request record 135.

The interface 310 can further provide active elements, such as links 312 and 314, to enable different aspects of the failed service request to be viewed by an operator. In examples, the presentation component 170 can generate a data path view for a given request, and further enable an operator to view the data path visualization through selection of a corresponding active element (e.g., direct link 312) that is displayed on the interface 310. In this way, an operator can use the link 312 to access a data path view of the failed service request, as illustrated and described with an example of FIG. 3B.

Additionally, the presentation component 170 can generate direct link 314 to provide an operator with access to different parts of a corresponding service request record 135. For example, the direct link 314 can enable the operator to view a partial trace route for the failed service request. The partial trace route can, for example, display logging information for individual programs 82 which successfully handled the failed service request and/or the logging error generated by the program 82 where the failure occurred.

FIG. 3B illustrates an example interface that can be generated in response to the operator selecting to view a data path of a failed service request. The interface 320 can be generated by the presentation component 170 as a response to the operator's selection of the link 312. As shown, the interface 320 displays a data path representation 322 of a failed service request. In an example of FIG. 3B, the data path representation 322 is a partial view of the total data path for the particular request, with the partial view focusing on the portion of the failed request which is most-relevant to the failure analysis (e.g., the group of programs preceding the detected failure). The network computer system 100 can include functionality to generate the data path representation 322 by, for example, parsing logging events 131 and trace routes 133 of a failed service request to identify individual programs 82 which handled the service request. The data path representation 322 can represent individual programs 82 as nodes 321, and the data path view 322 can display a series of nodes 321 to represent the sequence of programs which handled the failed service request. The data path representation 322 can also identify candidate program(s) which are a likely source of the service request failure. As shown by an example of FIG. 3B, the identified candidate programs can be reflected on the data path representation 322 as corresponding problem nodes 325, 327. The problem nodes 325, 327 can be displayed to be visually distinct from the other nodes of the data path representation 322.

In FIG. 3C illustrates an example interface that can be generated to provide status information about service requests received in a given time interval. In examples, the presentation component 170 can generate the service request feed 330 to display a service request feed 330 in which separate representations of multiple incoming service requests 331 are displayed concurrently. The request feed 332 can present individual requests 331 with corresponding status indicators, where each status indicator indicates whether (i) a service request is being handled without error or failure, (ii) a service request is being handled with potential error or failure (e.g., service request taking too long to handle by one or more programs of the respective data path), and/or (iii) a service request has encountered an error or failure. As shown, the status of the service indicators can be reflected by color coding (e.g., green, yellow and red). As described with other examples, other types of status indicators can also be determined and indicated with individual service requests of the service request feed 330.

In examples, the successful service requests can be aggregated to determine and update one or more data path models 155, while failed service requests can be analyzed to determine the cause of the failure, using an application data path model 155. The visual indication of status on the request feed can provide another mechanism to facilitate an operator to readily identify the occurrence of errors or failures in individual service requests.

Figure 4A:
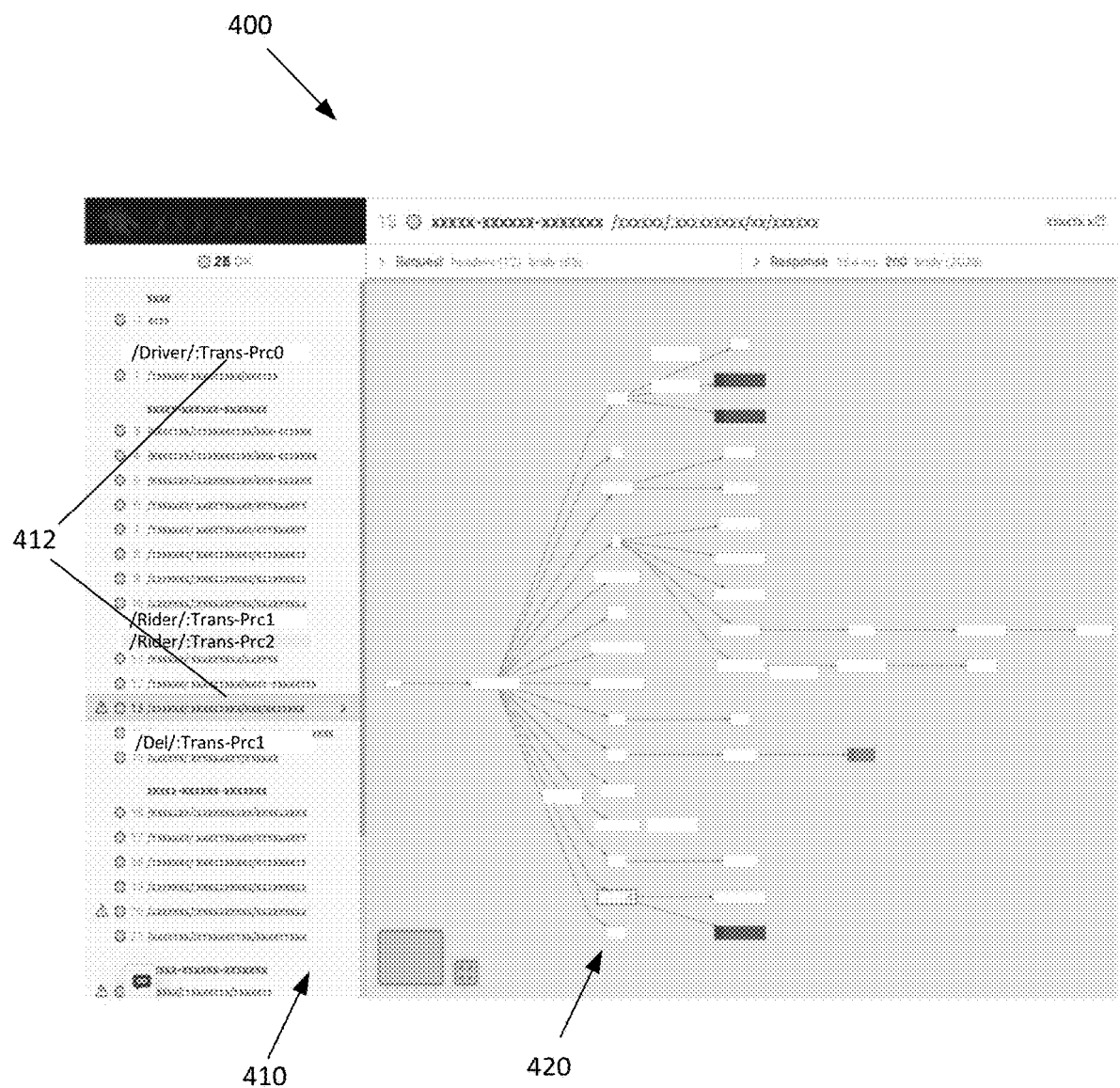
FIG. 4A through FIG. 4D illustrate another example of an operator user interface to facilitate mitigation of a network service failure.

FIG. 4A illustrates an example operator user interface 400 that provides a nodal representation of the individual workflows for multiple processes of a network service. With reference to an example of FIG. 1, the operator user interface 400 may be generated by the presentation component 170, in connection with the network computer system 100 implementing the network service 80 in any one of multiple possible environments (e.g., production environment where users are actively using the network service 80, test environment, or simulation). In examples, the operator user interface 400 can be rendered on a terminal of a network operator to facilitate the network operator in viewing, analyzing and/or mitigating against errors that may occur with individual processes of the network service. In some examples, the network operator may also view remedial actions (e.g., as determined or implemented by the failure analysis component 170) which are suggested and/or implemented by the network computer system 100 when service requests are detected as failing. The operator user interface 400 may provide information that reflects a current or real-time status of the network service 80, such as with respect to service requests which were received by the network service 80 within a given duration of time (e.g., within a prior 10 second or 1 minute interval).

In an example of FIG. 4A, the operator user interface 400 includes a process selection panel 410 and a nodal view 420. The process selection panel 410 can include process selection features 412, each of which are individually selectable by a network operator to generate a respective nodal view 420 of the process as currently implemented for the network service in a given environment. By way of example, an on-demand transport delivery service can include separate sets of processes for different classes of users (e.g., transport providers, deliverers, service requesters, etc.), and for different types of services (e.g., pooled transport, luxury transport, food delivery, etc.). In examples, the respective workflow implemented by each process can be triggered or otherwise initiated by a service request generated from an external device (e.g., user device), such as by a given user (e.g., service provider or driver, service requester or rider etc.) interacting with their respective user device to utilize the network service 80 (e.g., using a service application running on the respective user device). For example, a process selection feature 412 may be selectable by the network operator to generate the nodal view 420 for the process. As described with examples, the nodal view 420 of a selected process may represent one or more data path models that identify components (e.g., microservices) of the process, as well as sequencing amongst components in the workflow of the selected process.

In examples, each process, the corresponding nodal view 420 can provide a visualization that is based on the data path model for that process. Accordingly, the nodal view 420 for each process can represent each program of a corresponding workflow as a node, with the nodes being arranged to reflect an expected sequence (or sequences) by which the corresponding programs of the workflow will execute when a service request is received and successfully handled. In examples, the nodal view 420 can also reflect alternative sequences and variations amongst the programs of the workflow, with individual nodes of the respective workflows being associated with one or more probabilities. As described with other examples, a probability associated with a node of a nodal view 420 may represent a likelihood that the program will be called by another program of the workflow. In variations, a probability associated with a program may represent a likelihood that the program will call another program that is identified by a linked downstream node when a given service request is received and successfully handled.

In examples, the nodal view 420 can be provided with service request information to depict the handling of individual service requests by a given process of the network service. For example, the nodal view 420 can identify the programs that were used to handle individual service requests, including service requests which were successfully handled and service requests which experienced failures. For each service request, the nodal view 420 can identify the specific programs which executed to handle an aspect of the workflow, as well as sequence information (e.g., based on the program's respective start time or completion) for the program. In generating the nodal view 420, the network computer system 100 can also compare the detected workflow (e.g., programs and sequence in which programs were executed) with the nodal representation of a data path model. For successful service requests, the comparison may identify, for example, programs and microservices which both executed and did not execute.

As an addition or alternative, the nodal view 420 can include service request information that visually represents information about the handling of a service request by a selected process. The nodal view 420 can, for example, include service request information which identifies the sequencing amongst programs and microservices which successfully handled one or more service requests for the selected process. Still further, the service request information can be provided with the nodal view 420 to provide information about service requests which failed or otherwise reported errors. In providing information about individual service requests, some examples further provide for the nodal view 420 to include service request information as visual indicators which identify components (or microservices) which (i) executed without reporting errors (or as expected), (ii) did not execute, and/or (iii) reported an error or failure in connection with failure of the service request. For example, the nodal view 420 can generate the nodal view 420 of a given process, with each node being color-coded or visually marked to reflect anyone of multiple possible outcomes for a corresponding program or microservice (e.g., executed without error, executed with error, did not execute, etc.) of the given process.

Figure 4B:
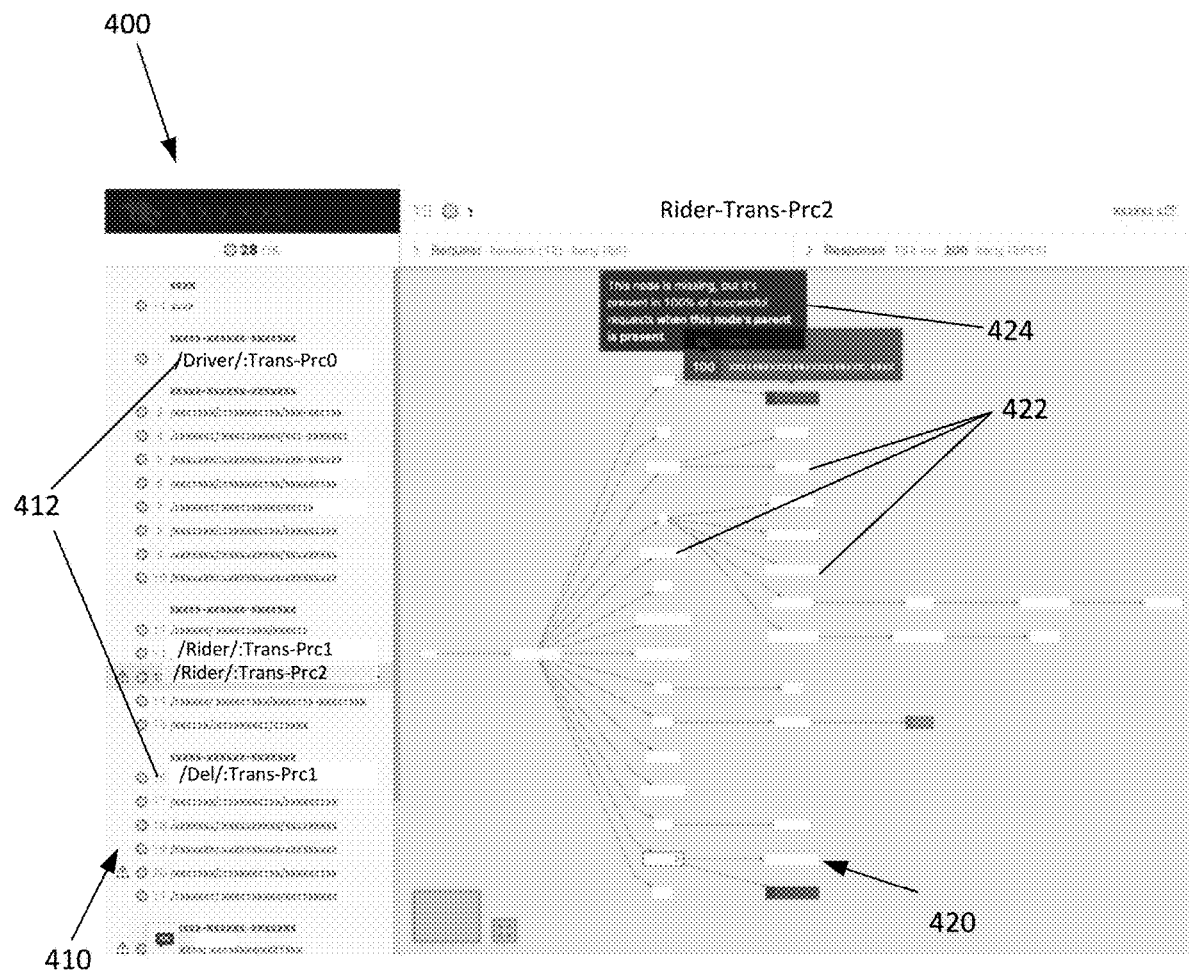

FIG. 4B illustrates the operator user interface 400 configured to identify information about service request failures which are detected in the implementation of the on-demand network service. In one implementation, the operator user interface 400 can display information determined from programmatic analysis of individual service request failures, with the operator user interface 400 being configured to depict information for individual service requests and/or aggregates of service requests. In variations, the operator user interface 400 can display information determined from analysis of multiple service requests, such that an instance of the operator user interface 400 can display information for multiple service request failures at one time (e.g., service request failures which occurred over a given time interval, such as preceding 5 minutes).

In an example of FIG. 4B, the nodal view 420 includes service request information that visually marks individual nodes to reflect a determination as to whether the corresponding program executed, did not execute or partially executed, in connection with a specific service request. Still further, in examples the service request information may reflect whether a program reported an error or failure that is not otherwise expected when the process successfully handles the service request. In examples, the nodal view 420 may integrate service request information for individual requests in a variety of ways, such as through visual markers or text blocks. By way of example, the nodes 422 of nodal view 420 can, for a given service request, include (i) a first visual indicator (e.g., white or clear fill) to represent a determination that the corresponding program was determined to have successfully executed, (ii) a second visual indicator (e.g., solid fill) to represent a determination that the corresponding program was determined to not have executed, and (iii) a third visual indicator (e.g., nodal outline) to represent a determination that the corresponding program was determined to have failed and/or reported an error that is not otherwise expected when a service request is successfully handled by the process. In variants, the nodal view 420 can utilize additional or alternative markers to indicate other determinations of the network computer system 100, such as a determination that one or more programs of the process executed in a sequence that is not expected based on the data path model for the process.

As an addition or variation, the nodal view 420 may include node-specific messages 424 that are probative of an underlying cause for a failed service request. With further reference to FIG. 1, the node-specific messages 424 may be generated by the presentation component 160, based on an output of the failure analysis component 160. In this way, the node-specific message 424 provides an example of how the network computer system 100 can pinpoint a specific program, or set of programs, as a source (or likely source) of a failure in the corresponding process. Accordingly, in an example of FIG. 4B, the node-specific messages 424 can display, for example, information that reflects a determination about an outcome or state of a particular program of the process. In examples, the node-specific message 424 may be visually overlaid or linked to a particular node 422 to reflect a determination that the associated program did not behave in a manner that was expected, based on the data path model for the process. For example, as shown by FIG. 4B, the node-specific message 424 may render with a particular node 422 to reflect a determination that the program associated with the node did not execute but was expected to have executed (e.g., based on a statistical probability).

Figure 4C:
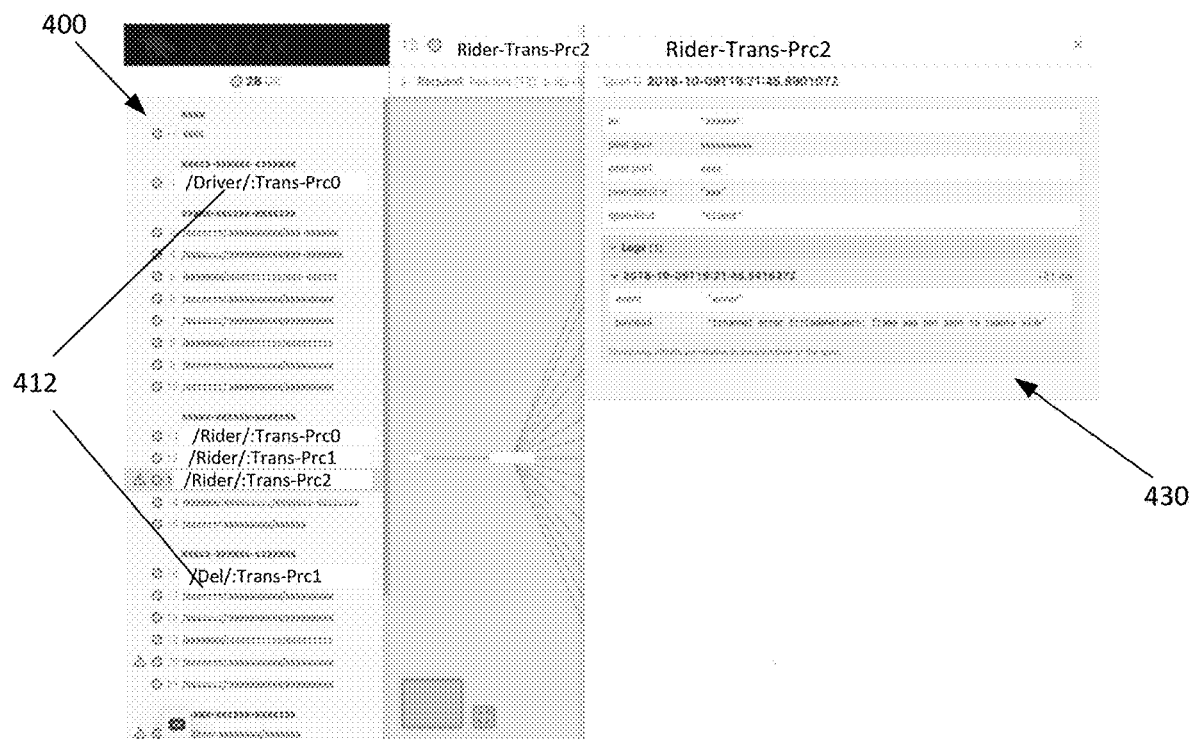

FIG. 4C illustrates an example in which the operator user interface 400 is configured to provide a record view interface from which service request information can be viewed and analyzed for individual programs of a process. As shown by an example of FIG. 4C, a node 422 (e.g., representing a first-in-time program of the workflow) is selected from a nodal view 420 to provide a record view interface 430 from which service request information for one or more service requests can be viewed. In examples, the record view interface 430 that is provided in connection with a selected node 422 displays service request information that is generated or otherwise related to the corresponding program of the selected node. The record view interface 430 can, for example, be generated by the presentation component 170 to display logging events and logging information from the from the reporting data store 130 for the given service request and the program associated with the selected node 422. The record view interface 430 can, for example, render service request information from the corresponding service request record 135, including the logging events, trace route, and/or other information maintained with the record.

Figure 4D:
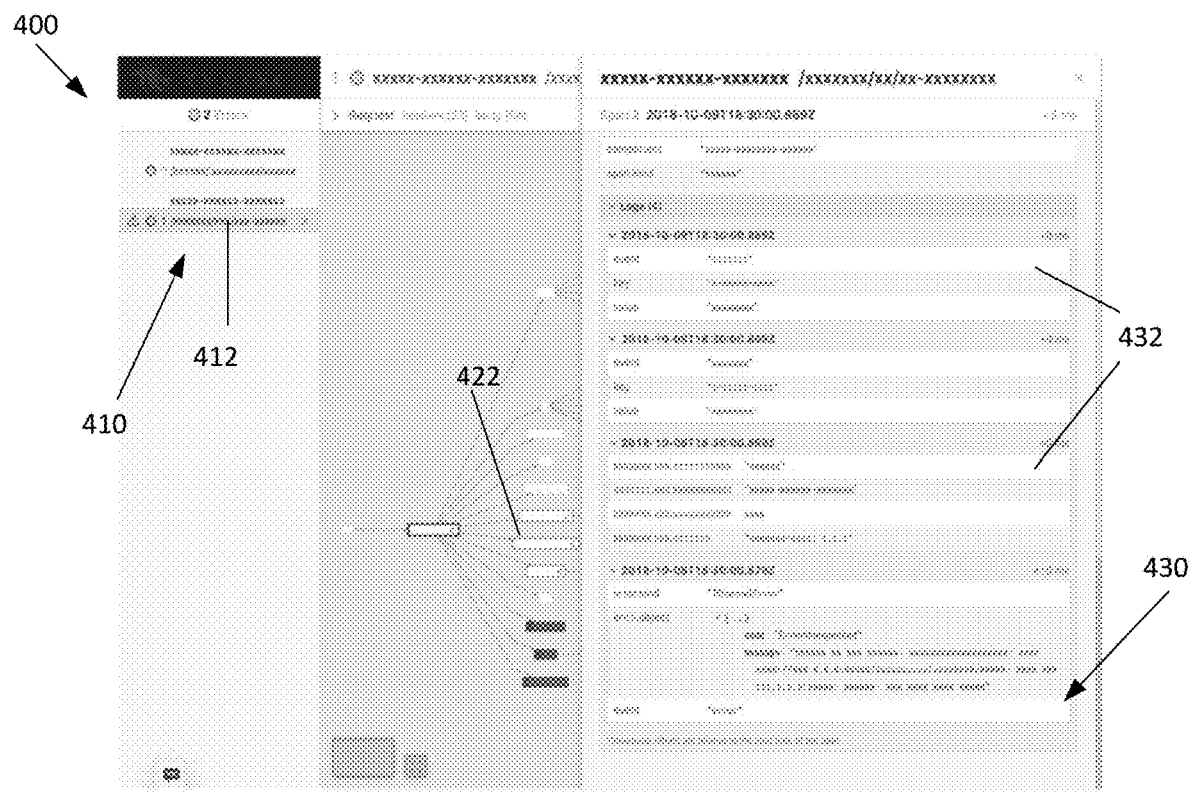

FIG. 4D illustrates an example in which the operator user interface 400 provides multiple record view interfaces 430 in connection with rendering the nodal view 420 for a given service request. In an example, a failed service request can be detected and indicated visually by, for example, marking the corresponding process and one or more programs of the selected process which generate logging events that are indicative of an error or failure having occurred in the respective workflow. Additionally, in examples, the operator user interface 400 can provide a record view interface 430 for multiple logs of the selected process. For example, the operator user interface 400 can provide record view interfaces the selected program or process. The record view interfaces 430 for the multiple logs can be rendered at one time. Among other benefits, examples as described enable a network operator to view and analyze logging events from multiple components or programs of a failed process at one time, to better correlate logging events from programs of the process which report failures in their respective logging information.

Additionally, as shown by an example of FIG. 4D, the operator user interface 400 may be also configured to provide service request information that includes indicators reflecting a state of individual processes of the network service. In examples, the process selection feature 412 for a failed process may be marked to reflect the detection of an open or new service request failure. With reference to FIG. 1, the indication of the failed process may be generated by the presentation component 170, based on an output of the failure analysis component 160. In examples, a service request failure may be open when, for example, the service request failure has not been viewed, or alternatively, resolved. Similarly, a new service request may reflect a service request failure that occurred in a preceding time interval (e.g., prior minute). When a service request failure is detected for a given process, the process selection feature 412 for the process may be provided with a visual marker that reflects the state of the process, with the state value represents (i) whether any open or new service request failures are associated with the corresponding process, and/or (ii) a number of open or new service requests. In a variation, the process selection feature 412 of the corresponding process 410 may be provided with a visual marker (e.g., the process selection feature 412 may be color-coded) to reflect the state of the corresponding process. In another variation, process selection feature 412 may be provided with a numerical marker 415 which signifies the occurrence of one or more open or new service request failures.

Example Methods

Figure 5A:
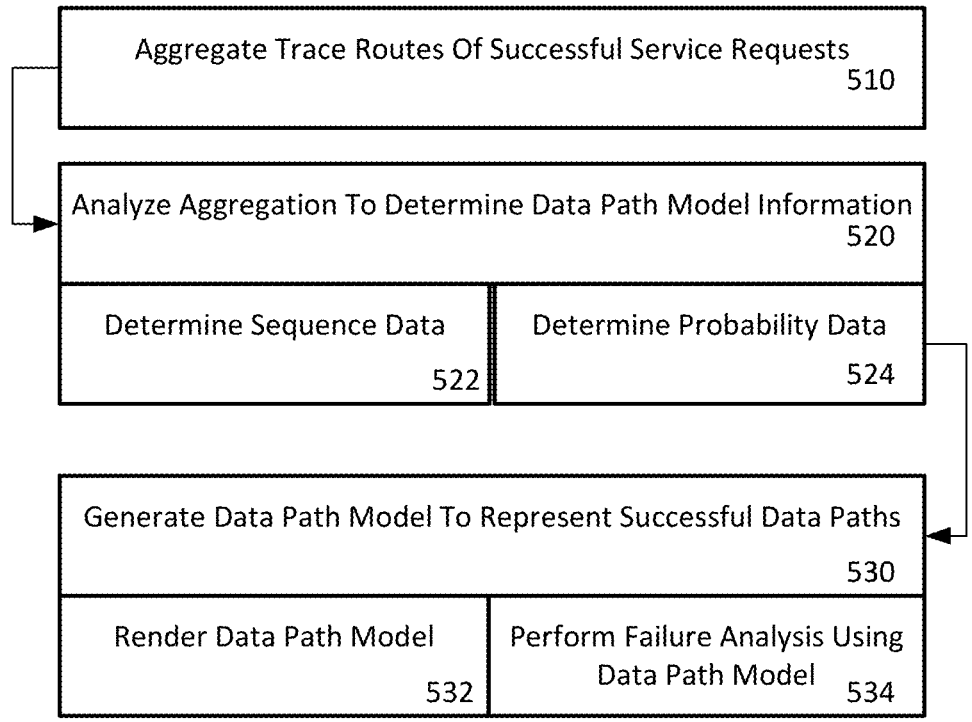
FIG. 5A illustrates an example method for determining a data path model that identifies one or more expected data paths for handling service requests made to a network service.
Figure 5B:
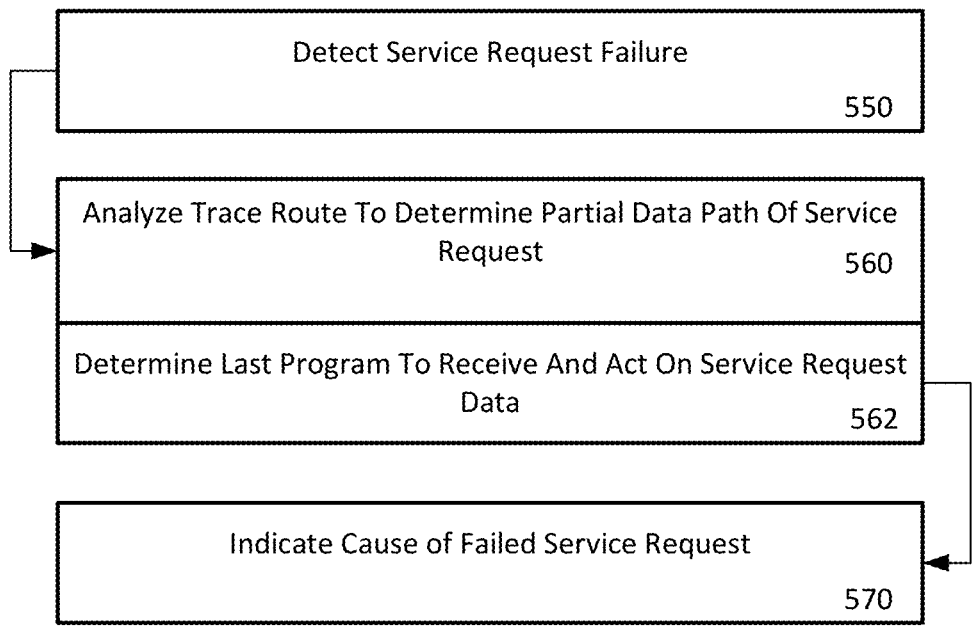
FIG. 5B illustrates an example method for diagnosing a failed service request using a data path model.

FIG. 5A illustrates an example method for determining a data path model that identifies one or more expected data paths for handling service requests to the network service. FIG. 5B illustrates an example method for diagnosing a failed service request using a data path model. Example methods such as described by examples of FIG. 5A and FIG. 5B may be described with reference to elements of FIG. 1, for purpose of illustrating suitable components or elements for performing a step or sub-step being described.

In FIG. 5A, the aggregation component 142 aggregates trace routes of successful service requests (510). The aggregation may be performed over a relevant time period, with sufficient number of trace routes being aggregated to determine a statistical sample that is representative of the various data paths used by the network computer system 100 to handle service requests.

The log analyzer 140 can analyze the aggregation to determine data path model information (520). The data path model information can identify sequence data, where the sequence data identifies two or more programs that are expected to be sequenced with respect to one another. The sequence information can also identify successive programs that act to receive and act on the service request until the handling of the service request is completed (522).

Additionally, the log analyzer 140 can use the aggregation of the trace routes to determine probability information, where the probability information identifies the likelihood that particular sequences may occur, or that a program may be called or otherwise execute to handle a particular service request at a particular time (524).

In examples, one or more data path models are generated to represent expected events, with respect to programs 82 handing requests to the on-demand network service 80 (530). Through monitoring and analysis of logging information, derived data path models can be updated repeatedly over time, to provide a more accurate depiction of expected events which may follow receipt of a service request. In some examples, the data path models can be rendered graphically (532), with program nodes representing individual programs of the on-demand network service 80, with sequence data (along with probability data) being represented by links or connectors between program nodes. As an addition or variation, the data path models can be used to perform failure analysis (534), such as described with other examples (e.g., see FIG. 2C and FIG. 2D).

With reference to an example of FIG. 5B, a service request failure is detected by the network computer system 100 (550). In examples, the service request failure can be detected automatically, by, for example, the failure analysis component 160 analyzing logging information, or other programmatic resources which can scan and parse logging events to determine the request failures.

The failure analysis component 160 can analyze a trace route of the failed service request for analysis (560). The analysis may include, for example, a determination of the last program that received and acted on the service request (562). The network computer system 100 can use the data path model to identify a candidate set of programs, or possible next events following the last program that received and acted on the service request.

From the determination, the network computer system 100 can indicate a cause of the service request failure (570). In examples, the network computer system 100 can identify one or more candidate programs that are deemed to be the cause of the service request failure on an interface of an operator terminal. The network computer system 100 can, for example, generate an interface that illustrates the candidate programs which are the likely cause of the service request failure. In variations, the network computer system 100 can implement logic to identify which of a candidate set of programs that are the cause of the service request failure.

Still further, in some variations, the network computer system 100 can implement logic to mitigate an identified failure. For example, the network computer system 100 can implement logic to programmatically implement a remedial measure, where data paths that utilize the problematic program are minimized.

Figure 6:
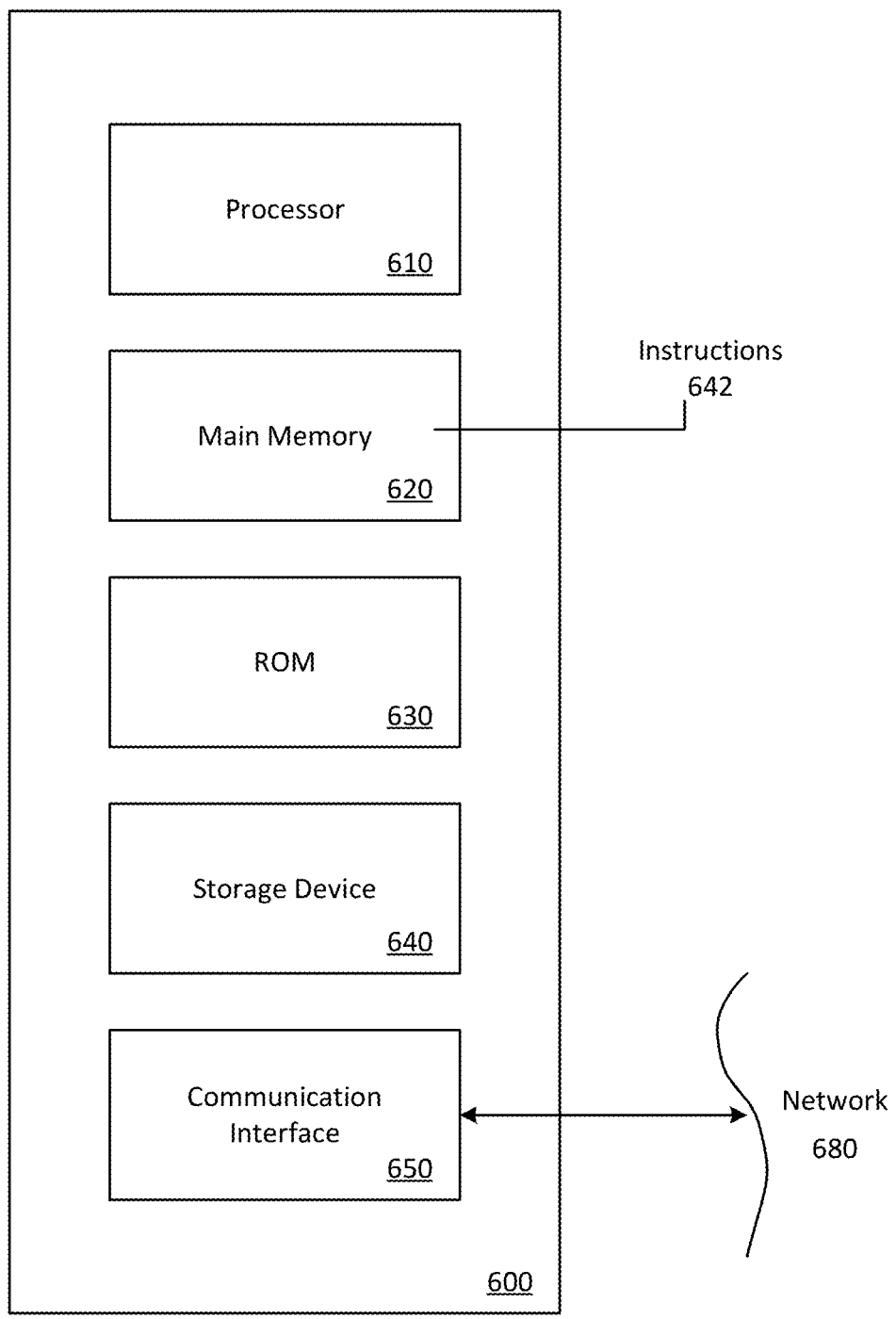
FIG. 6 illustrates a computer system on which one or more embodiments may be implemented.

FIG. 6 illustrates a computer system on which one or more embodiments can be implemented. A computer system 600 can be implemented on, for example, a server or combination of servers. For example, the computer system 500 may be implemented as part of network computer system 100, as described with an example of FIG. 1. Likewise, the computer system 600 can implement methods such as described with examples of FIG. 5A and FIG. 5B.

In one implementation, the computer system 600 includes processing resources 610, memory resources 620 (e.g., read-only memory (ROM) or random-access memory (RAM)), a storage device 640, and a communication interface 650. The computer system 600 includes at least one processor 610 for processing information stored in the memory resources 620 (e.g., main memory), such as provided by a random-access memory (RAM) or other dynamic storage device, for storing information and instructions which are executable by the processor 610. The memory resources 620 may also be used to store temporary variables or other intermediate information during execution of instructions to be executed by the processor 610. The computer system 600 may also include the memory resources 620 or other static storage device for storing static information and instructions for the processor 610. The storage device 640, such as a magnetic disk or optical disk, is provided for storing information and instructions.

The communication interface 660 enables the computer system 600 to communicate with one or more networks (e.g., cellular network) through use of the network link 680 (wireless or a wire). Using the network link 680, the computer system 600 can communicate with one or more computing devices, specialized devices and modules, and one or more servers. The executable instructions stored in the memory 630 can include instructions 642, to implement a network computer system such as described with an example of FIG. 1. The executable instructions stored in the memory 620 may also implement a method, such as described with one or more examples of FIG. 6A and FIG. 6B.

As such, examples described herein are related to the use of the computer system 600 for implementing the techniques described herein. According to an aspect, techniques are performed by the computer system 600 in response to the processor 610 executing one or more sequences of one or more instructions contained in the memory 620. Such instructions may be read into the memory 620 from another machine-readable medium, such as the storage device 640. Execution of the sequences of instructions contained in the memory 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

CONCLUSION

Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A network computer system comprising:
   one or more processors; and
   a set of memory resources, the set of memory resources storing a set of instructions, wherein the one or more processors access the instructions to:
   determine logging information for a collection of service requests associated with a network service, the logging information including trace routes that identify (i) multiple programs which execute to fulfill each service request of the collection, and (ii) timing information usable to identify a relative timing between individual programs of the multiple programs executing in fulfilling service requests;
   generate one or more data path models that identify multiple possible data paths using the logging information, the one or more data path models comprising sequence data identifying a relative order by which at least some of the multiple programs execute to fulfill service requests;
   determine that a service request associated with the network service has failed;
   determine a trace route for the failed service request;
   match one or more programs identified in the trace route to a data path model in the one or more data path models;
   determine, from the trace route, at least one first program of the multiple programs that acted on the failed service request; and
   determine, based at least in part on sequence data from the data path model and (ii) the at least one first program, at least one second program of the multiple programs that was expected to act on the failed service request.

2. The network computer system of claim 1, wherein the data path model includes probability information, the probability information indicating a probability as to a relative order when individual programs of the multiple programs execute in fulfilling service requests for each of the multiple possible data paths of the data path model.

3. The network computer system of claim 2, wherein the at least one first program includes a last program that successfully performed a task for the failed service request.

4. The network computer system of claim 3, wherein determining the at least one second program includes determining, based on the probability information, one or more candidate programs that have some probability of executing after the last program.

5. The network computer system of claim 2, wherein generating the data model comprises:
 determining trace routes between the multiple programs for a plurality of successful service requests; and
 determining sequence data and probability data associated with each program node based on an aggregation of the trace routes for the plurality of successful service requests.

6. The network computer system of claim 1, wherein the one or more processors access the instructions to:
 identify a particular program that is a cause of failure of the failed service request based at least in part on the logging information.

7. The network computer system of claim 6, wherein the particular program is identified using particular logging information, selected from the logging information, that was generated by the at least one second program.

8. The network computer system of claim 6, wherein the particular program is one of the at least one second program.

9. The network computer system of claim 6, wherein the particular program is downstream of one of the at least one second program.

10. The network computer system of claim 6, wherein the one or more processors access the instructions to:
 implement at least one programmatic operation to mitigate the cause of the failure.

11. The network computer system of claim 10, wherein the at least one programmatic operation includes triggering a restart of the particular program that is the cause of the failure.

12. The network computer system of claim 1, wherein the one or more processors access the instructions to:
 generate an interactive tool to present information about the failed service request, the interactive tool comprising a data path view interface including a graphical representation of at least a portion of a data path of the failed service request.

13. The network computer system of claim 12, wherein the graphical representation includes a last program to perform a task to fulfill the failed service request, and one or more programs that are expected by the data path model to have called or been called by the last program.

14. The network computer system of claim 12, wherein the graphical representation indicates a particular program that is a likely source of the failed service request.

15. The network computer system of claim 1, wherein the data path model is arranged in a graph data structure comprising nodes that each represent a program of the multiple programs, the graph data structure including edges representing the possible data paths between pairs of the multiple programs.

16. A method for mitigating failures for a network service, the method being implemented by one or more processors and comprising:
 determining logging information for a collection of service requests associated with a network service, the logging information including trace routes that identify (i) multiple programs which execute to fulfill each service request of the collection, and (ii) timing information usable to identify a relative timing between individual programs of the multiple programs executing in fulfilling service requests;
 generating one or more data path models that identify multiple possible data paths using the logging information, the one or more data path models comprising sequence data identifying a relative order by which at least some of the multiple programs execute to fulfill service requests;
 determining that a service request associated with the network service has failed;
 determining a trace route for the failed service request;
 matching one or more programs identified in the trace route to a data path model in the one or more data path models;
 determining, from the trace route, at least one first program of the multiple programs that acted on the failed service request; and
 determining, based at least in part on sequence data from the data path model and (ii) the at least one first program, at least one second program of the multiple programs that was expected to act on the failed service request.

17. The method of claim 16, wherein the data path model includes probability information, the probability information indicating a probability as to a relative order when individual programs of the multiple programs execute in fulfilling service requests for each of the multiple possible data paths of the data path model.

18. The method of claim 16, further comprising:
 identifying a particular program that is a cause of failure of the failed service request based at least in part on the logging information.

19. The method of claim 18, wherein the particular program is identified using particular logging information, selected from the logging information, that was generated by the at least one second program.

20. A non-transitory computer-readable medium that stores instructions, which when executed by one or more processors of a computer system, cause the computer system to perform operations that include:
 determining logging information for a collection of service requests associated with a network service, the logging information including trace routes that identify (i) multiple programs which execute to fulfill each service request of the collection, and (ii) timing information usable to identify a relative timing between individual programs of the multiple programs executing in fulfilling service requests;
 generating one or more data path models that identify multiple possible data paths using the logging information, the one or more data path models comprising sequence data identifying a relative order by which at least some of the multiple programs execute to fulfill service requests;

determining that a service request associated with the network service has failed;

determining a trace route for the failed service request;

matching one or more programs identified in the trace route to a data path model in the one or more data path models;

determining, from the trace route, at least one first program of the multiple programs that acted on the failed service request; and determining, based at least in part on sequence data from the data path model and (ii) the at least one first program, at least one second program of the multiple programs that was expected to act on the failed service request.

* * * * *